(12) United States Patent  
Hancock

(10) Patent No.: US 8,517,682 B2  
(45) Date of Patent: Aug. 27, 2013

(54) WIND TURBINE BLADE

(75) Inventor: Mark Hancock, Southhampton (GB)

(73) Assignee: Vestas Wind Systems A/S, Aarhus N (DK)

( * ) Notice: Subject to any disclaimer, the term of this patent is extended or adjusted under 35 U.S.C. 154(b) by 896 days.

(21) Appl. No.: 12/598,272

(22) PCT Filed: Apr. 30, 2008

(86) PCT No.: PCT/EP2008/055366  
§ 371 (c)(1),  
(2), (4) Date: Jan. 15, 2010

(87) PCT Pub. No.: WO2008/132235  
PCT Pub. Date: Nov. 6, 2008

(65) Prior Publication Data  
US 2010/0127504 A1    May 27, 2010

(30) Foreign Application Priority Data  
Apr. 30, 2007  (WO) ................. PCT/EP2007/054223

(51) Int. Cl.  
*B64C 11/28*    (2006.01)

(52) U.S. Cl.  
USPC ............. 416/23; 416/232; 416/228; 416/240; 416/241 R

(58) Field of Classification Search  
USPC .................................... 416/23, 232, 228, 240  
See application file for complete search history.

(56) References Cited

U.S. PATENT DOCUMENTS

| | | | |
|---|---|---|---|
| 2,333,482 A | 11/1943 | Littman | |
| 2,616,509 A | 11/1952 | Thomas | |
| 3,698,668 A * | 10/1972 | Cole | 244/219 |
| 3,987,984 A | 10/1976 | Fischer | |
| 4,113,210 A * | 9/1978 | Pierce | 244/219 |
| 4,298,313 A | 11/1981 | Hohenemser et al. | |

(Continued)

FOREIGN PATENT DOCUMENTS

| | | |
|---|---|---|
| DE | 3219930 | 1/1983 |
| DE | 4002972 | 8/1991 |

(Continued)

OTHER PUBLICATIONS

Marc Gultzow; Notice of Opposition issued in corresponding European Patent No. 08749944.8; Jan. 23, 2012; 19 pages; European Patent Office.

*Primary Examiner* — Ninh H Nguyen  
(74) *Attorney, Agent, or Firm* — Wood, Herron & Evans, LLP

(57) ABSTRACT

A wind turbine blade having a suction side and a pressure side, which sides are connected at a leading edge and a trailing edge, wherein one or more shape modifiable air foil sections are defined in the area of the trailing edge of the blade, and wherein said one or more shape modifiable air foil sections are attached to a blade body, each of the one or more modifiable air foil sections having an upper skin and a lower skin, a first one of the upper and lower skin being secured to the blade body, and a second one of the upper and lower skin being slidably movable with respect to the blade body, so that a force is applied to one of said skins cause said second skin to slide with respect to the blade body, so as to thereby modify the air foil shape of the trailing edge.

24 Claims, 3 Drawing Sheets

(56) References Cited

U.S. PATENT DOCUMENTS

| | | | |
|---|---|---|---|
| 5,570,859 A | 11/1996 | Quandt | |
| 6,138,956 A * | 10/2000 | Monner | 244/215 |
| 6,213,433 B1 | 4/2001 | Gruensfelder et al. | |
| 6,419,187 B1 | 7/2002 | Buter et al. | |
| 6,644,599 B2 * | 11/2003 | Perez | 244/219 |
| 7,436,083 B2 * | 10/2008 | Shibata et al. | 290/44 |
| 7,632,068 B2 * | 12/2009 | Bak et al. | 416/23 |
| 2003/0123973 A1 | 7/2003 | Murakami | |
| 2004/0105752 A1 | 6/2004 | Wobben | |
| 2006/0145483 A1 | 7/2006 | Larsen et al. | |
| 2008/0292461 A1 | 11/2008 | Stiesdal | |
| 2009/0028705 A1 | 1/2009 | Meldgaard et al. | |

FOREIGN PATENT DOCUMENTS

| | | |
|---|---|---|
| DE | 100 21 850 | 11/2001 |
| DE | 102 33 102 | 1/2004 |
| DE | 10233102 | 1/2004 |
| EP | 0283730 | 2/1988 |
| EP | 1524431 | 7/2004 |
| EP | 1666723 | 6/2006 |
| FR | 2290585 | 11/1974 |
| GB | 2308836 | 9/1997 |
| JP | 2006248456 | 9/2006 |
| WO | WO 00/75508 | 12/2000 |
| WO | 02/051730 | 7/2002 |
| WO | WO 2004/088130 | 10/2004 |
| WO | WO 2004/099608 | 11/2004 |
| WO | WO 2007/045940 | 4/2007 |

* cited by examiner

WIND TURBINE BLADE

PRIORITY CLAIM

This is a U.S. national stage of application No. PCT/EP2008/055366, filed on Apr. 30, 2008. Priority is claimed on the following application: PCT Application No. PCT/EP2007/054223 Filed: Apr. 30, 2007, the content of which is incorporated here by reference.

FIELD OF THE INVENTION

The present invention relates to a wind turbine blade comprising one or more modifiable air foil sections which are attached to the blade body, the air foil sections being adapted to modify the air foil shape of a trailing edge of the blade. Moreover, the present invention relates to a wind turbine comprising at least one of the wind turbine blade.

BACKGROUND OF THE INVENTION

Wind turbine blades which are adapted to change shape during use are known in the art. One such example is disclosed in WO 2004/088130 which discloses a wind turbine blade comprising one or more shape modifiable air foils sections wherein the outer surface of each of the shape modifiable air foils are substantially continuous in all of its shape and actuating means for providing the shape changes in the shape modifiable air foil sections.

However known systems may exhibit poor mechanical stability. Moreover, known systems are generally made from expensive materials.

It is an object of a preferred embodiment of the present invention to provide an alternative to known systems for changing the profile of a wind turbine blade. Moreover, it is an object of a preferred embodiment of the present invention to provide simple and reliable solution for changing to profile of a wind turbine blade. Additionally, it is an object of a preferred embodiment of the present invention to provide an inexpensive system for changing the profile of a wind turbine blade.

BRIEF DESCRIPTION OF THE INVENTION

In a first aspect the present invention relates to a wind turbine blade having a suction side and a pressure side, which sides are connected at a leading edge and a trailing edge, the blade including a blade body and one or more shape modifiable air foil sections in the area of the trailing edge of the blade, each of the one or more modifiable air foil sections having a pressure skin and a suction skin, a first one of the pressure and suction skins being secured to or integral with the blade body, and a second one of the pressure and suction skins being slidably movable with respect to the blade body, so that a force applied to one of said skins causes said second skin to slide with respect to the blade body, so as to thereby modify the air foil shape of the trailing edge.

Thanks to the provision of shape modifiable airfoil sections, preferred embodiments of the inventions reduces variations in loads on the blade. Such load variations may e.g. derive from turbulence, wind shear, tower shadow, gusts and yaw errors. Embodiments of the invention provide an overall reduction of turbine mass, including the mass of the blades, tower, hub and foundation, or they allow for an increased rotor size, i.e. increased energy production, at the same load level relative to a smaller rotor without shape modifiable trailing edge sections.

In comparison to prior art shape modifiable air foil sections, embodiments of the blade according to the present invention are beneficial with respect to mechanical stability and costs. The non-movable parts of the blade, including the blade body and/or the first skin, may be made from any material used in wind turbine blade production, and a variety of materials are available for the second skin. Examples of materials for the second skin, which may be sufficiently flexible and yet sufficiently stiff to resist aerodynamic loads include glass reinforced plastic (GRP), Kevlar, carbon, rubber, wood, fibre carbon, epoxy, and aluminium. For example, in a 1 m chord blade the moveable trailing edge might be 0.3 m chordwise and 3 mm thick of GRP. The differential pressure across the trailing edge might be 3 kN/m2 exerting a chordwise force of approximately 0.9 kN m length and a BM of 0.135 kNm per m length. This can be balanced by a force of 1.5 kN per m length with a typical 90 mm lever arm at the sliding joint. This may be balanced in an embodiment with vacuum actuation by a vacuum pressure differential over 90 mm of 33 kN/m2 or ⅓ rd bar. The movement of the sliding joint to obtain a strong camber and a major lift increase is of the order of 10 mm.

In the present context, the term 'slide' should be understood to encompass any relative linear or rotational movement between the second skin and the blade body.

In the present context, the term 'wind turbine' should be understood to include any machine capable of drawing energy out of moving air and converting such energy to mechanical and/or electrical energy.

The ability of the second skin to slide with respect to the blade body confers the benefit that profile continuity from leading edge to trailing edge can be ensured in preferred embodiments of the invention.

Preferably, the chord-wise length and the thickness of the deformable trailing edge section do not change when the section deforms.

In one embodiment, the suction skin is secured to or integral with the blade body, while the pressure skin is movable (slidable) with respect to the blade body. In other embodiments, the pressure skin is secured to or integral with the blade body, while the suction skin is movable with respect to the blade body.

The blade or the wind turbine preferably comprises a controller capable of controlling the shape of the at least one shape modifiable air foil section, e.g. via an actuator, so as to adapt the shape of the shape modifiable air foil section(s) to external conditions. Such conditions may e.g. include wind velocity, wind direction, rpm of the wing, generator load, blade deflection, blade rate of deflection, blade acceleration, inflow angle, sectional pressure distribution, and/or blade root bending moment. The actuator control preferably ensures profile continuity from leading edge to trailing edge at any position along the blade surface.

The trailing edge portions may be releasably attached to the blade body, e.g by means of a bolt and nut, thus allowing the air foil sections to be replaced or serviced. In one embodiment, the first i.e. non-movable skin is formed integrally with the blade body, the first skin thereby forming an extension of the blade body. The blade or the airfoil sections may comprise a light material such as Glass Reinforced Plastic or Kevlar, carbon, rubber, or wood. The blade body may e.g. be made from the aforementioned materials and/or from fibre carbon, epoxy, aluminium, and/or from pultruded elements, e.g. as described in European patent No. 1 417 409 B1.

The second skin may be slidably movable transversely to a longitudinal direction of the blade. In one embodiment at least a part of the second skin is adapted to overlap at least a part of the blade body during said sliding movement. In order to reduce turbulence in the area of overlap, the blade body may in said area of overlap define a recess for receiving the overlapping part of the air foil such that during relative movement between the air foil and the blade body the overlapping part of the second skin may be moved into or out of the recess.

The blade may comprise at least one shape-modifiable chamber defined by at least one wall, which forms part of or is connected to one of said skins, so that the second skin moves when the force is applied to the chamber wall. For example, in order to generate the relative movement between the air foil and the blade body, each of the shape modifiable air foil sections may comprise a pressure chamber which when pressurised or depressurized provides said force. In the context of the present invention the term "pressurised" and "depressurized" shall be understood as increases or decreases, respectively, of the pressure in the pressure chamber. In one embodiment, the second skin forms a wall of the pressure chamber. Hence, pressurization or depressurization of the pressure chamber causes the wall (i.e. the second skin) to move relative to the blade body.

The interior of the blade or part thereof may conveniently be utilized as a vacuum reservoir and/or a reservoir of compressed air. The reservoir may for example extend longitudinally within the blade. Alternatively or additionally, a pump system may be provided in the interior of the blade, or appropriate connectors may be provided for connecting the chamber or pressure chamber to an external pressure/vacuum source arranged e.g. in a nacelle of a wind turbine. In one embodiment, the blade comprises a spar, which may be used as a support for the vacuum/pressure reservoir or source. For example, the spar itself or a part thereof may itself constitute the vacuum or pressure reservoir.

Alternative actuator systems for modifying the shape of the trailing edge air foil sections may include an electric actuator, a hydraulic actuator, a link motion system, and/or so-called "smart materials", including piezo-electric materials, magnetostrictive and electrostrictive materials, i.e. materials with a capability to change viscosity, e.g. from liquid to almost solid state, shape alloy materials (SMA), thermoresponsive materials and/or conducting polymers.

The air foil shape may define a relaxed state and an actuated non-relaxed state. In one embodiment, pressurisation of the pressure chamber causes the air foil shape to move from the relaxed state to the actuated state. In another embodiment depressurization of the pressure chamber causes the air foil shape to move from the relaxed state to the actuated state. An applied pressure may affect the air foil section in a downward direction, and suction may affect the air foil section in an upward direction.

In one embodiment air foil shape is provided in the relaxed state when the pressure in the pressure chamber is substantially equal to the ambient air pressure, i.e. the air pressure at the geographical location of the blade/wind turbine. In another embodiment the air foil shape is provided in the actuated state when the pressure in the pressure chamber is substantially equal to the ambient air pressure.

In one embodiment a decrease in the air pressure in the pressure chamber causes the pressure chamber to contract while increases in the air pressure causes the pressure chamber to expand. Expansion or contraction of the pressure chamber causes said second one of the upper and lower skin to move relative to the blade body. In one embodiment expansion of the pressure chamber causes said second one of the upper and lower skin to move away from the blade body and vice versa.

In order to generate the increase and decrease in the pressure chamber the blade may comprise one or more actuators, each of which may be adapted to change the pressure in the pressure chamber of at least one of the air foil sections. The actuators may be provided closer to a hub portion than to a tip portion of the blade.

At least 10%, i.e. 10-100% of the length of the trailing edge, when measured from a tip portion to a hub portion of the blade, may be shape modifiable by means of an air foil section, such as about 10-50%, such as 10-40%, such as about 15-35%, such as about 20-30%. The deformable section or sections are optimally placed along the span of the blade in such a way to maximize the load reduction. The exact placement may be determined e.g. by trial and error testing and/or by numeric simulation. In one embodiment the shape modifiable portion of the trailing edge is located closer to a tip portion of the blade than to a hub portion thereof. As an example the shape modifiable portion may be provided in the tip portion of the blade, i.e. the distance from the air foil section to the tip may constitute less than 10% or the total length of the blade, such as less than 5%, such as less than 2% of the length of the blade. The deformable section or sections, also referred to as trailing edge flaps, have been found to be most efficient near the tip of the blade. In preferred embodiments of the invention, the trailing edge flaps are placed near the tip of the blade in such a way that load alleviation is maximized. The trailing edge flaps need not be contiguous (i.e. in one piece). They may be made of several piece with or without mutual interstices.

At transitions between shape-modifiable trailing edge sections and non-shape modifiable trailing edge sections, the blade may preferably comprise a transition section made from shape-modifiable material, e.g. an elastomeric material, in order to ensure a continuous and/or unbroken transition between the modifiable and non-modifiable trailing edge sections.

At least 5% of the blade in the direction from the trailing edge towards the leading edge, when measured in a chord direction of the blade, may be shape modifiable, such as at least 10%, at least 20%, at least 30%, such as at least 40%, such as at least 50%. In one embodiment 5-30% of the blade in the direction from the trailing edge towards the leading edge, when measured in a chord direction of the blade, is shape modifiable.

Embodiments of the present invention also include shape modifiable air foil sections at the inboard section of the blade, i.e. within 50% of the blade lengths from the root of the blade. Shape modifiable inboard sections of the blades may limit thrust, improve aerodynamic efficiency, and they may be used for rotor speed control.

The skins may be sufficiently flexible to bend so as to allow the aerofoil shape of the blade to change when the air foil is moved from the relaxed to the actuated state. At the same time the said skins may be sufficiently stiff to resist aerodynamic loads, such that the air foil(s) may be trimmed in order to obtain more energy from the wind acting on the blade. The flexibility of the skins may be graduated (may vary) in the chordwise direction of the blade so as to obtain the desired airfoil shape whilst retaining sufficient stiffness to resist local aerodynamic pressure differences.

The actuator for providing the actuating force to modify the air foil sections may be provided within the blade or outside the blade. In the latter embodiment, a force distributing system is preferably provided in order to distribute the force to the individual blades of the wind turbine. In case of a pressurisation or depressurization actuator, such a vacuum source, or in case of a hydraulic actuator, one or more accumulators may be provided, so that a boost is available, when a change of shape is needed.

The shape modifiable air foil section or sections may be provided continuously over the entire length of the blade or continuously over a portion thereof. Alternatively, spaced shape modifiable sections (or "flaps") may be provided with interstices of non-modifiable sections being provided between them. Preferably, transitions from shape-modifiable and non-modifiable sections should be continuous and closed. The separate sections may be individually controllable or controllable in common, i.e. all having the same and/or proportional shape and/or deflection angle. Separate actuators may be provided for each of the sections, or a common actuator and a force distributing system may be provided.

In a second aspect, the present invention relates to a wind turbine comprising at least one blade as described herein, such as two blades, such as three blades, such as four blades, such as five blades.

The wind turbine may comprise an actuator for providing the force mentioned under the first aspect of the invention. The force may be generated for a one or more of the blades of the wind turbine. In one embodiment the actuator is adapted to generate a vacuum source or a pressurised source. In one embodiment the wind turbine comprises a plurality of the blades according to the first aspect of the invention and one vacuum source which is connected to the pressure chamber of at least two of the blades.

It should be understood that the provision of pressure as a source for an actuating force for modifying the shape of an airfoil section of a wind turbine blade constitutes an independent aspect of the present invention. Hence, in a third aspect, the invention provides a wind turbine blade having a suction side and a pressure side, which sides are connected at a leading edge and a trailing edge, wherein one or more shape modifiable air foil sections are defined in the area of the trailing edge of the blade, and wherein each of the shape modifiable air foil sections comprises a pressure chamber which when pressurised or depressurized causes a modification of the shape of the airfoil section.

Embodiments of the blade of the third aspect of the invention may include features of the blade of the first aspect of the invention. Hence, each of the shape modifiable air foil sections may have a pressure skin and a suction skin, with a first one of the pressure and suction skins being secured to or integral with the blade body, and a second one of the pressure and suction skins being slidably movable with respect to the blade body, so that a force applied to one of the skins causes the second skin to slide with respect to the blade body, so as to thereby modify the air foil shape of the trailing edge. Such embodiments are described in detail above with reference to the first aspect of the invention, and it will be appreciated that any structural and functional feature described herein may be provided in embodiments of the blade of the third aspect of the invention.

The invention also provides a wind turbine comprising a blade according to the third aspect of the invention, and an actuator comprising a vacuum and/or pressure source for providing pressurization and/or depressurization of the pressure chamber.

Further, the invention provides a wind turbine blade having a suction side and a pressure side, which sides are connected at a leading edge and a trailing edge, the blade including a blade body and one or more shape modifiable air foil sections in the area of the trailing edge of the blade, each of the one or more shape modifiable air foil sections having a pressure skin and a suction skin, a first one of the pressure and suction skins being secured to or integral with the blade body, and a second one of the pressure and suction skins being slidably movable with respect to the blade body, so that a force applied to said first skin causes said second skin to move with respect to the blade body, so as to thereby modify the airfoil shape of the trailing edge.

The invention additionally provides a wind turbine comprising a tower, one end of which is configured to be secured to the ground, and to an opposite end of which there is mounted a nacelle, the wind turbine further comprising:
  a driving shaft supported by the nacelle;
  a rotor comprising a plurality of wind turbine blades according to the present invention, the rotor being mounted on said driving shaft;
wherein the driving shaft is connected to or forms part of a drive chain, which is connected to a generator, which is supported by the nacelle, and which is configured to convert mechanical energy delivered from the rotor to the driving shaft into electrical energy.

The wind turbine may e.g. constitute a horizontal-axis wind turbine comprising three blades.

BRIEF DESCRIPTION OF THE DRAWINGS

The invention will now be described in further detail with reference to the drawings in which.

DETAILED DESCRIPTION OF THE DRAWINGS

Figure 1:
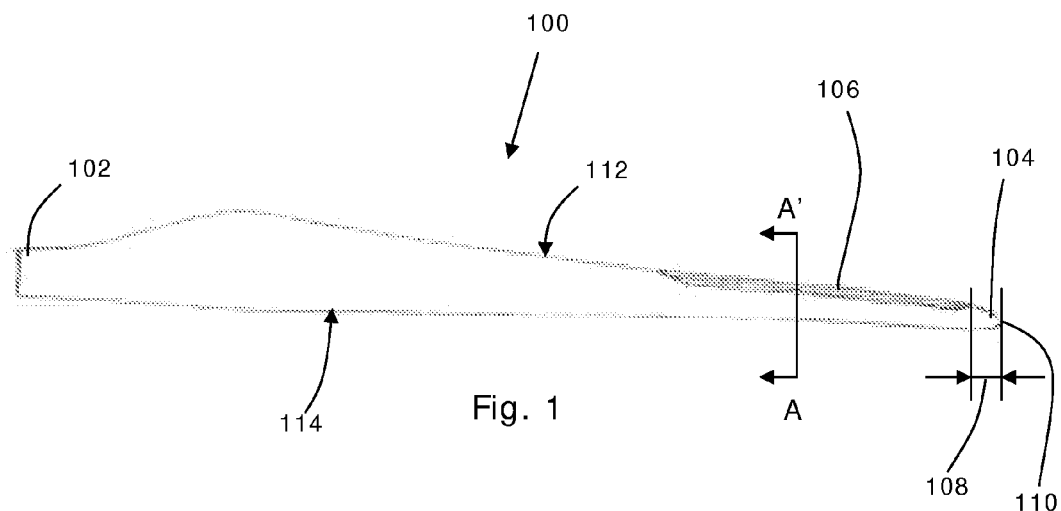
FIG. 1 discloses a front view of a wind turbine blade when seen from the pressure side (windard side),
  FIG. 2 discloses a cross section A-A' of the wind turbine blade of FIG. 1,
  FIG. 3 discloses movement of the airfoil between the relaxed position and the actuated position, and
  FIG. 4 discloses a close up of the pressure chamber of the air foil.

FIG. 1 discloses a front elevational view of a wind turbine blade 100, which defines a root portion 102 and a tip portion 104. The wind turbine blade 100 comprises an air foil 106, which is provided closer to the tip portion 104 of the blade 100 than to the root hub portion 102. The distance 108 between the tip 110 and the airfoil is preferably below 10% of the total length of the blade 100. The root hub portion comprises means (not shown) for securing the blade 100 to the hub of a wind turbine. The blade defines a trailing edge 112 and a leading edge 114. The air foil 106 is shape modifiable so as to allow the blade 100 to modify the air foil shape of its trailing edge 112. At least 10%, such as at least 25% of the trailing edge 112, when measured from the tip portion 104 to the root hub portion 102 is shape modifiable due to the air foil 106.

Figure 2:
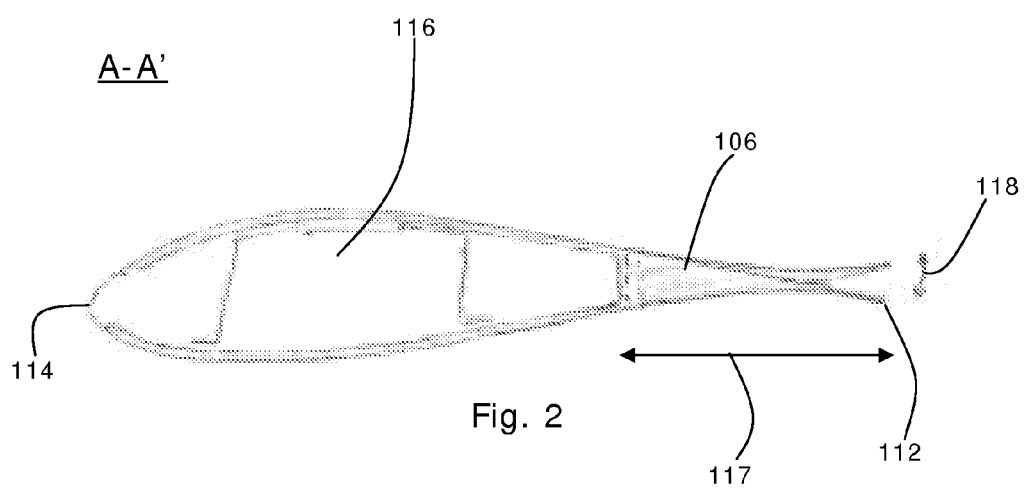

FIG. 2 discloses a cross-section A-A' of the blade 100 of FIG. 1. The blade 100 defines a leading edge 114 and a trailing edge 112. The blade 100 comprises an air foil 106 which is secured to a blade body 116 of the blade 100, e.g. by means of a bolt and a nut (not shown). The air foil is movable between a relaxed state and an actuated state as indicated by arrow 118, and the air foil constitutes at least 5% of the blade in the direction from the trailing edge to the leading edge as indicated by arrow 117.

Figure 3:
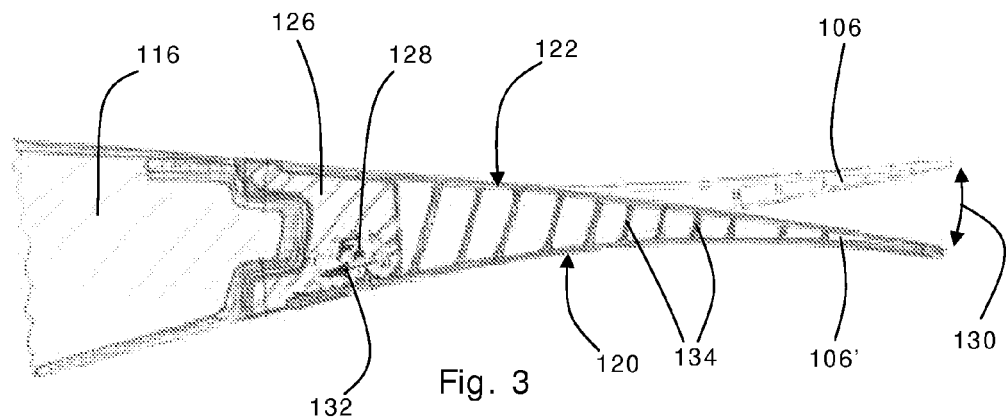

FIG. 3 discloses the air foil 106',106 in the relaxed state 106 and in the actuated state 106'. The air foil defines a lower skin 120 and an upper skin 122. The upper skin is secured to a base part 126 of the air foil 106, while the lower skin 120 is adapted to slide relative to the base part 126. Accordingly, depressurizing a pressure chamber 128 causes the air foil to move from the relaxed state 106 to the actuated state 106' as indicated by arrow 130. At the same time the lower skin 120 slides relative to the base as indicated by arrow 132. In the embodiment of FIG. 3 the air foil 106 comprises a plurality of reinforcing bars 134, and it will be appreciated that said bars 134 must be sufficiently flexible to allow the air foil to move from the relaxed state 106 to the actuated state 106'. In an alternative embodiment the air foil does not comprise the reinforcing bars 134.

In order to ensure sealing of the vacuum and/or pressure chamber or chambers 128, the ends of the shape modifiable air foil sections should be closed. Also, a pressure tight closure should be provided at the transition from the shape modifiable air foil sections.

Figure 4:
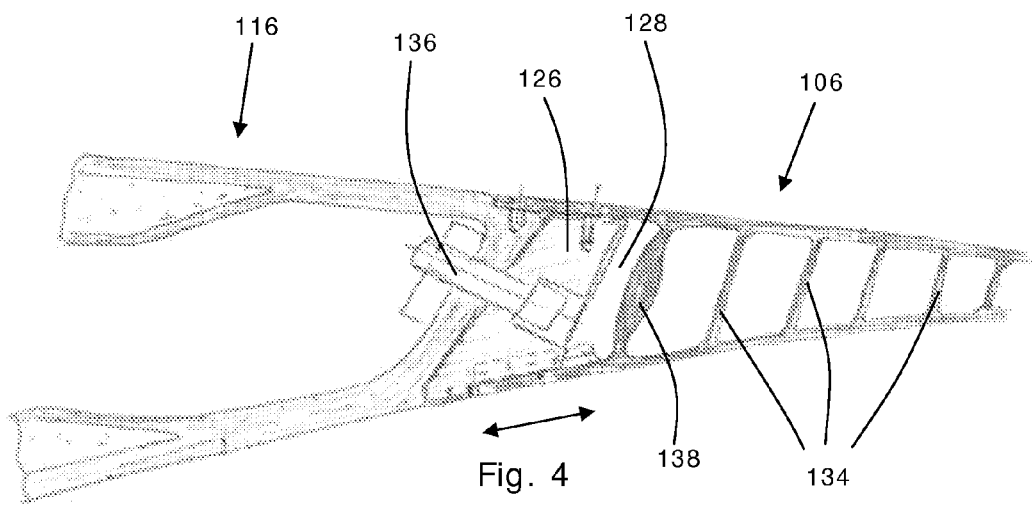

FIG. 4 discloses a close up of the area of attachment of the air foil 106 to the blade body 116. The base part 126 of the air foil is secured to the blade body 116 by means of a nut and a bolt 136. A pressure chamber 128 is defined between the base part 126 and a wall 138. Depressurization of the pressure chamber 128 causes the air foil to move downwards in the drawing. Alternatively, or as a supplement, pressurisation of the pressure chamber causes the air foil to move upwards in the drawing.

Figure 5:
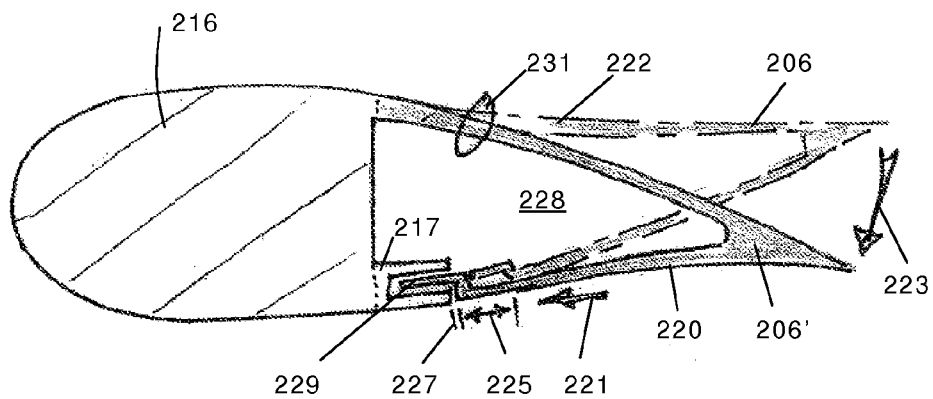
FIGS. 5-7 disclose further embodiments of a blade according to the present invention.
Figure 6:
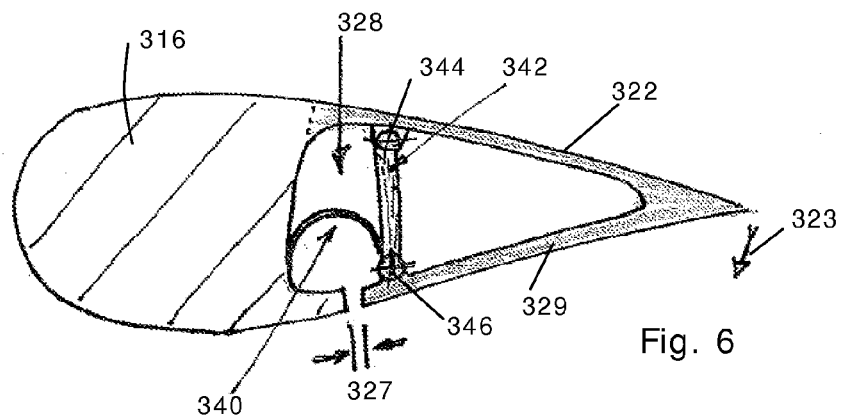
Figure 7:
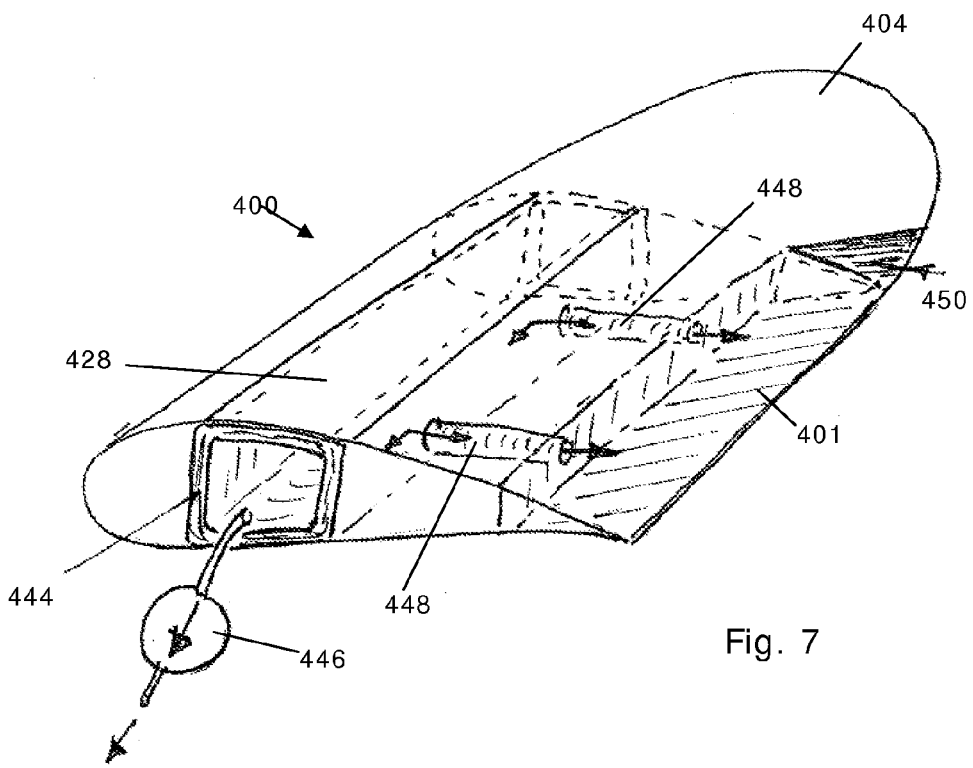

FIGS. 5-7 show cross sections of further embodiments of a blade according to the present invention. The embodiment of FIG. 5 comprises a blade body 216, and lower and upper skins 220 and 222. The cross section of the lower skin 220 has an L-shaped extension 229 at the transition between the lower skin 220 and the blade body 216, the L-shaped extension being receivable in a corresponding U-shaped profile 217 of the blade body 216. The trailing edge section is movable as a result of an applied operating force 221, originating e.g. from a force source provided in a cavity 228, e.g. a pressure chamber, in the blade. Alternatively, the operating force may result from aerodynamic forces acting on the trailing edge. The applied operating force results in a displacement of the trailing edge from the relaxed state 206 to the as indicated by arrow 223 actuated state 206'. At the same time, the lower skin moves along arrow 225, thereby reducing or extending the gap 227, while the extension 229 slides in the profile 217. At position 231 of the upper skin 222, the bending stiffness of the upper skin is preferably tailored to make the desired shape of the trailing edge upon application of the operating force.

The blade of FIG. 6, the lower and upper skins 320, 322 are interconnected by a hinged plate 342 extending through the blade. The plate is hinged to the upper skin at hinge 344 and to the lower skin at hinge 346. A pressure chamber 328 is defined by a wall of the blade body 316, a deformable membrane 340 and the hinged plate 342. As a result of a change of pressure in the pressure chamber 328, the membrane 340 will act on the hinged plate 342, which in turn will act on the upper and/or lower skin in order to move the trailing edge along the path indicated by arrow 323. At the same time, the size of the gap 327 changes.

FIG. 7 shows a perspective illustration of a blade 400 comprising a shape-modifiable trailing edge section 401. The blade comprises a spar 444 forming a cavity 428, which is utilized as a pressure/vacuum reservoir. Pressure or vacuum is provided by a pressure or vacuum pump 446 arranged in the blade, e.g. in a different section of the spar, or in a nacelle of a wind turbine. The reservoir 428 is in fluid communication with the shape-modifiable trailing edge via tubes 448. The shape of the trailing edge section of the blade is modifiable by the structure of any of FIGS. 3-6. A section of elastomeric material 450 is provided at a transition between the trailing edge section or flap' 401 and a tip portion 404 of the blade.

The invention claimed is:

1. A wind turbine blade having a suction side and a pressure side, which sides are connected at a leading edge and a trailing edge, the blade including a blade body and one or more shape modifiable air foil sections in the area of the trailing edge of the blade, each of the one or more shape modifiable air foil sections having a pressure skin and a suction skin, the suction skin being secured to or integral with the blade body, and the pressure skin being slidably movable with respect to the blade body, the blade further including an actuator for applying a force to one of said skins that causes said pressure skin to slide with respect to the blade body, so as to thereby modify the airfoil shape of the trailing edge, wherein
at least 10% of the length of the trailing edge, when measured from a tip portion to a hub portion of the blade, is shape modifiable, and wherein
the shape modifiable portion of the trailing edge is closer to a tip portion of the blade than to a hub portion thereof.

2. The blade according to claim 1, wherein said pressure skin is slidably movable transversely to a longitudinal direction of the blade.

3. The blade according to claim 1, wherein the blade comprises at least one shape-modifiable chamber defined by at least one wall, which forms part of or is connected to one of said skins, so that the pressure skin moves when the force is applied to the chamber wall.

4. The blade according to claim 1, wherein each of the shape modifiable air foil sections comprises a pressure chamber which when pressurized or depressurized provides said force.

5. The blade according to claim 4, wherein the blade comprises a vacuum reservoir and/or a reservoir of compressed air.

6. The blade according to claim 4, wherein the actuator changes the pressure in the pressure chamber of at least one of the air foil sections.

7. The blade according to claim 1, wherein at least 5% of the blade in the direction from the trailing edge towards the leading edge, when measured in a chord direction of the blade, is shape modifiable.

8. The blade according to claim 1, wherein said skins are sufficiently flexible to bend so as to allow the aerofoil shape of the blade to change and sufficiently stiff to resist aerodynamic loads.

9. The blade according to claim 8, wherein the flexibility of the skins is graduated in the chordwise direction of the blade.

10. A wind turbine comprising at least one blade having a suction side and a pressure side, which sides are connected at a leading edge and a trailing edge, the blade including a blade body and one or more shape modifiable air foil sections in the area of the trailing edge of the blade, each of the one or more shape modifiable air foil sections having a pressure skin and a suction skin, the suction skin being secured to or integral with the blade body, and the pressure skin being slidably movable with respect to the blade body, the blade further including an actuator for applying a force to one of said skins that causes said pressure skin to slide with respect to the blade body, so as to thereby modify the airfoil shape of the trailing edge,
wherein at least 10% of the length of the trailing edge, when measured from a tip portion to a hub portion of the blade, is shape modifiable, and
wherein the shape modifiable portion of the trailing edge is closer to a tip portion of the blade than to a hub portion thereof.

11. The wind turbine according to claim 10, wherein said actuator comprises a vacuum and/or pressure source.

12. The wind turbine according to claim 10, comprising a plurality of blades and one vacuum source connected to at least two of the blades.

13. A wind turbine comprising a tower, one end of which is configured to be secured to the ground, and to an opposite end of which there is mounted a nacelle, the wind turbine further comprising:
   a driving shaft supported by the nacelle;
   a rotor being mounted on said driving shaft and comprising a plurality of wind turbine blades, with each blade having a suction side and a pressure side, which sides are connected at a leading edge and a trailing edge, the blade including a blade body and one or more shape modifiable air foil sections in the area of the trailing edge of the blade, each of the one or more shape modifiable air foil sections having a pressure skin and a suction skin, the suction skin being secured to or integral with the blade body, and the pressure skin being slidably movable with respect to the blade body, the blade further including an actuator for applying a force to one of said skins that causes said pressure skin to slide with respect to the blade body, so as to thereby modify the airfoil shape of the trailing edge,
   wherein at least 10% of the length of the trailing edge, when measured from a tip portion to a hub portion of the blade, is shape modifiable,
   wherein the shape modifiable portion of the trailing edge is closer to a tip portion of the blade than to a hub portion thereof, and
   wherein the driving shaft is connected to or forms part of a drive chain, which is connected to a generator, which is supported by the nacelle, and which is configured to convert mechanical energy delivered from the rotor to the driving shaft into electrical energy.

14. A blade for a wind turbine, comprising:
   a leading edge;
   a trailing edge;
   a pressure side between said leading and trailing edges;
   a suction side between said leading and trailing edges, opposite said pressure side;
   a fluid chamber;
   a moveable member in communication with the fluid chamber such that a change in pressure of the fluid in the fluid chamber moves the moveable member for changing the shape of the trailing edge; and
   a blade body having one or more shape modifiable air foil sections in an area of the trailing edge of the blade, each of the one or more shape modifiable air foil sections having a skin slidably moveable with respect to the blade body.

15. The blade according to claim 14, wherein the fluid chamber is secured to the wind turbine.

16. The blade according to claim 15, wherein the fluid chamber is disposed within the blade.

17. The blade according to claim 14, wherein at least 10% of the length of the trailing edge, when measured from a tip portion to a hub portion of the blade, changes shape as a result of movement of the moveable member.

18. The blade according to claim 14, wherein a part of the skin is adapted to overlap a part of the blade body at an overlap region as a result of the sliding movement.

19. The blade according to claim 18, wherein the blade body defines a recess at the overlap region for receiving the part of the skin.

20. The blade according to claim 14, wherein the one or more shape modifiable air foil sections extend over the entire length of the blade.

21. The blade according to claim 14, wherein the one or more shape modifiable air foil sections extend over one or more portions of the length of the blade.

22. The blade according to claim 14, wherein said one or more shape modifiable air foil sections each has a pressure skin and a suction skin, and wherein the blade comprises a plate hingedly connected to at least one of the pressure skin and suction skin, and the pressure chamber is defined between a wall of the blade body and the plate, and wherein the moveable member is disposed in the pressure chamber.

23. The blade according to claim 14, further comprising a spar forming a pressure reservoir in communication with the fluid chamber, and a conduit connecting the pressure reservoir to the trailing edge.

24. The blade according to claim 14, wherein the moveable member is connected to the fluid chamber.

* * * * *